Patented Apr. 1, 1941

2,236,527

UNITED STATES PATENT OFFICE 2,236,527

ADHESIVE SHEET AND METHOD OF MAKING

Richard Gurley Drew, St. Paul, Minn., assignor to Minnesota Mining & Manufacturing Company, St. Paul, Minn., a corporation of Delaware No Drawing. Application December 23, 1938, Serial No. 247,486

14 Claims. (Cl. 91—68)

This invention relates to an improved pressure-sensitive adhesive sheet, conveniently in the form of an adhesive tape, having a flexible unified paper backing provided with a coating of normally tacky and pressure-sensitive adhesive; and includes methods of making. The backing is comprised of paper which has been unified by impregnation with a relatively non-tacky non-hygroscopic water-insoluble rubber-resin composition which binds the fibres together so as to strengthen the paper and render it tougher and resistant to splitting, and at the same time imparts other desirable characteristics, but without making the backing undesirably stiff.

This application is a continuation-in-part of my copending applications, Ser. No. 660,167, filed March 9, 1933, and Ser. No. 198,769, filed March 29, 1938.

An object of the invention is to provide an improved masking tape for use in painting, as for example, in the spray-painting of automobiles, although the invention is not limited thereto. Masking tapes heretofore have largely been of the type wherein the paper backing is impregnated with a unifying composition which is hygroscopic in nature (exemplified by glue-glycerine), such hygroscopicity being necessary in order that moisture be present to maintain the backing in a flexible condition, but having many undesirable consequences owing to the wide variation in atmospheric conditions. A feature of the present invention is that the paper backing of the tape maintains uniform characteristics under varying atmospheric conditions, owing to the non-hygroscopic nature of the unifying impregnant, and yet possesses the many other characteristics that are desired in a masking tape backing, such as toughness, freedom from splitting when unwound from rolls, flexibility and pliancy, etc.

The difficulty is to provide an impregnated paper which will satisfy the many desired requirements. The backing should not only be water-insoluble and non-hygroscopic, but must be adequately unified and enable the adhesive coating to be firmly united thereto, should permit of a back surface which is sufficiently inactive to the adhesive to permit the tape to be wound in rolls without the use of a slip sheet and unwound without destroying the unity of the tape, should preferably permit the use of rubber base pressure-sensitive adhesive coatings by not containing an impregnant of a nature which will cause deterioration of the rubber therein, and the impregnant should not itself be subject to deterioration or change which will cause it to lose its desired characteristics.

In addition, the adhesive sheet or tape must not be rendered stiff, but should be flexible or pliant; and it should be tough enough to prevent accidental breaking or tearing, and yet not so tough as to make difficult the tearing or cutting off of desired lengths for use.

Mention has previously been made that, in accordance with the present invention, use is made of a rubber-resin mixture as the impregnant. Generally, the use of rubber compositions is attended by difficulties which render them unsuitable. First, there is the difficulty of securing adequate impregnation of even relatively porous paper. Highly viscous solutions will not penetrate properly and the use of a thin solution will result in so much solvent being present within the paper that an inadequate amount of solids is retained upon removal of the solvent, so that with many compositions no ratio of solvent exists which will lead to satisfactory impregnation. Further, with many compositions the backing is made so "rubbery" that it is rendered too elastic and too tear resistant for many purposes, or is rendered too heavy or stiff. Certain rubber mixtures do not produce sufficient fibre unity regardless of the degree of impregnation, or contain ingredients which cause rapid deterioration of the backing or of the adhesive coating.

A feature of the present invention is that masking tapes can be made which are free from lacquer running and sagging effects. These result, for example, when the tape is applied on a surface so as to be above an area which is to be spray coated. The lacquer solution which is deposited upon the back surface of the tape has a tendency to run off so as to deposit partly dried streaks or globules upon the adjacent margin of the area being painted, making the paint job uneven. In accordance with present invention, masking tapes are provided in which the back or exposed surface of the backing is sufficiently compatible with lacquer solvents so as to absorb such solvent from the applied lacquer solution to an extent which prevents the above-mentioned effects, but at the same time solvent penetration of the backing, to a degree causing the adhesive coating to separate or offset when the tape is removed from the job, is avoided.

An object of the present invention, then, is to provide a normally tacky and pressure-sensitive adhesive sheet or tape having a paper backing impregnated and unified with a rubber base mixture, and which will possess the desirable characteristics and avoid the undesirable characteristics previously indicated.

By "unified" I mean that the paper is saturated with a material which binds or welds the fibres together so that the backing will not split or the fibres pull loose under the force exerted by the normally tacky and pressure-sensitive adhesive coating when the product is unwound from rolls or removed from surfaces to which temporarily applied—that is, a fibre unity is present which prevents the unity of the backing from being destroyed by the pull of the adhesive.

By "normally tacky and pressure-sensitive" I mean that under ordinary atmospheric conditions the adhesive is stably in a condition such that it does not need to be activated by solvents or heat or otherwise prepared in order to secure good adherence to surfaces against which the adhesive tape may be pressed, to result in an aggressive adhesive bonding to the surface which resists separation therefrom except by a force greater than the pressure necessary to obtain adhesion. Furthermore, a "non-offsetting" adhesive layer is provided, meaning that the adhesive is possessed of such coherence in relation to adhesiveness and is so firmly united to its backing that the adhesive sheet may be stacked or rolled upon itself without offsetting upon separation or unwinding for use, and may be separated in condition for reuse from surfaces (not possessing special chemical affinity for the adhesive), to which it may have been temporarily applied, without offsetting of adhesive material. Hence the term "non-offsetting" designates an important physical or chemico-physical property or characteristic of the adhesive.

The paper backing may be creped, crimped, embossed, molded or otherwise formed so as to provide rugosities or corrugations whereby stretchability and an interrupted contacting surface is secured in the adhesive sheet product to facilitate unwinding from rolls and removal from stacks or surfaces to which temporarily applied, and to facilitate conforming the adhesive sheet to curved or irregular outlines or surfaces to which it may be applied. For purpose of convenience all such paper will be referred to hereafter as "creped paper." The unifying composition is distorable and stretchable and does not impair the aforesaid characteristics. The creped paper may be impregnated without causing a loss of the initial stretch of the paper, which is an important feature. The paper is rendered relatively inelastic, so that it has a comparatively "dead-stretch," owing to the relatively inelastic nature of the unifying impregnant. This is valuable, because it permits tapes, for example, to be conformed to irregular outlines or surfaces without having any substantial tendency to draw away due to elastic regain forces in the paper. A creped towelling paper, containing highly purified wood fibres, may be used to good advantage. Such paper may have a stretch of 25% for example. The paper may be creped to have a two-way stretch.

A flat, uncreped paper may be employed where stretchability is not needed or wanted, and this may be, for example, a kraft paper.

Any type of paper or paper-like sheet may be used to long as it is sufficiently porous or bibulous to permit of adequate impregnation to result in the desired unification. It may be made in whole or in part from wood, rope or rag fibres, or from other fibrous material, natural or synthetic, adapted to the making of thin flexible sheet material of adequate porosity and tensile strength.

Desirable types of especially thin unified paper can be made by using paper stock of a hemp fibre kind. An illustration is "Flexrope," a 100% rope paper made of reclaimed rope and characterized by long fibre length, open texture, high tensile strength and great uniformity. Another example is "Troya Tissue", made from new Manila hemp fibres and characterized by the fact that the fibres largely run in one direction, so that tapes can be made having a high lengthwise tensile strength and a high crosswise tear resistance. "Dextilose" is a Manila hemp fibre paper which has substantially the same lengthwise and crosswise tensile strength and tear resistance.

The impregnant which I preferably employ is comprised of a fluxed mixture of broken-down rubber, reinforcing pigment, and hardened rosin or the like, combined in proportions such that the product has a high degree of flexibility, is yieldable and stretchable, firm and cohesive, substantially non-tacky, and firmly unifies the fibres of the paper. In making the impregnating composition, the ingredients are preferably dispersed in a volatile organic solvent, to facilitate impregnation of the paper and to cause the impregnant to assume a highly cohesive state upon separation of the solvent vehicle following impregnation of the paper.

By "broken-down" rubber, I mean rubber which has been acted upon so that the "nerve" is reduced and the rubber made less elastic, more plastic, and more penetrative. This can be accomplished by mechanical working in the presence of heat and air (oxygen), as by mastication on a rubber mill and in a mixer. Oxidation plays a necessary part in the process of breaking down and is accompanied by disaggregation and disruption of the rubber particles, and probably depolymerization or degrading of the rubber molecules or macro-molecules also occurs. Whatever the precise mechanism and nature of the change may be, the broken-down rubber permits of securing thorough impregnation of the paper and a "dead-stretch" characteristic in creped paper, as well as making it possible to unify the paper while securing a unified paper that is flexible or pliant. The degree of breakdown which is necessary depends upon the porosity of the paper. A thin open-weave (as in "Troya Tissue") requires only a small degree in comparison with towelling. The rosin or the like further plasticizes the rubber and decreases the viscosity of solutions thereof, assists in cementing the fibres of the paper and makes the dried impregnant more firm and less "rubbery." The reinforcing pigment also makes the dried impregnant more firm and cohesive.

The nature of the impregnant and of the impregnating solution is more fully indicated in connection with the description of the following examples, in which all parts are by weight.

*Example 1*

| | Parts |
|---|---|
| Latex crepe | 100 |
| Zinc oxide | 100 |
| Rosin | 160 |
| Beta-naphthol (antioxidant) | 1 |
| Oleum spirits (volatile solvent) | 200 |

The preferred range of proportions in the above formula is as follows per 100 parts of rubber: 75–125 parts of zinc oxide and 140–180 parts of rosin. The solvent ratio should preferably be substantially as indicated for impregnating towelling and the like, although some variation may be desired depending upon the proportions of other ingredients and the degree of breakdown of the rubber; and in some cases a more dilute solution may be desired, as hereinafter described.

The rubber and zinc oxide are milled on an ordinary rubber mill for 30 minutes, at about 150–160° F., and then taken off in sheet form and placed in an internal mixer (such as a Baker Perkins Mogul mixer), the heating jacket of which carries steam at 40 lbs. pressure, and which has previously been allowed to warm up. A small proportion of the rosin (say 10–25%) is added to make for lubrication and a lower power requirement, and the mass is mixed for about 8–10 hours, or until reduced to a semi-fluid consistency. The rosin may be omitted from this stage of compounding, but with an increase in the power requirement; and an even greater proportion, or all, of the rosin may be added, but with an increase in the time required to secure the same degree of rubber breakdown. If all the rosin is added at the beginning, about 24 hours mixing will be required.

The balance of the rosin is added, care being taken to add slowly to avoid excessive foaming caused by the water evolved from the reaction between rosin and the zinc oxide, and mixing is continued for another hour. The beta-naphthol is added, and the steam turned off and cooling water introduced into the heating jacket of the mixer. The oleum spirits is then added with continued mixing for half an hour, or until the mixture is homogeneous. The resultant impregnating solution is then ready for use.

This unifying composition makes an impregnant which is non-corrosive and does not become corrosive when subjected to electric fields, and is electrically insulating. These characteristics render the unified paper suitable for use in making electrical insulating tapes.

The rubber is preferably latex crepe, but smoked sheets or reclaimed rubber may be used. Reclaimed rubber is less desirable because of its partial degree of vulcanization, which makes it more resistant to breakdown. Since reclaimed rubber ordinarily contains zinc oxide, a reduction may be made in the added zinc oxide, or the latter may be omitted. Equivalent rubber derivatives, synthetic rubbers, and rubber-like resins, may be substituted for all or part of the natural rubber.

The rosin may be gum rosin or wood rosin, and may be substituted for in whole or in part by equivalent synthetic or natural resins, as for example, ester gum, hydrogenated rosin, hydrogenated rosin ester, damar, copal or cumar, or an oil-soluble heat hardenable phenol-aldehyde resin that is set up by heating the impregnated paper. Mixtures of two or more of the resins may be used. The resin should be compatible with the rubber so as to form a homogeneous blend and should be sufficiently hard to impart firmness.

Rosin has been found to give the best results of any resin tried. It should be understood that this refers to the rosin as a raw material, for actually it is converted to a modified form in the impregnating solution prepared as hereinbefore described, as the result of being "hardened" by the zinc oxide whereby zinc abietate is produced and is the actual resin used in impregnating the paper. While it is preferred to harden the rosin in situ during the compounding, it may be hardened in advance by treatment with zinc oxide, etc. The amount of zinc oxide consumed by the reaction does not exceed about 8 parts by weight per 100 parts of rosin, and hence amounts to only a small fraction of the total specified in the foregoing formula. Other basic oxides may be used in place of or in conjunction with zinc oxide to form water-insoluble resinates. Thus a small amount of lime (preferably hydrated lime), for example 1 part in the foregoing formula, may be employed, or a small amount of magnesia.

Aside from hardening the rosin of the foregoing formula, the zinc oxide functions as a reinforcing pigment for the fluxed rubber-resin and thus brings it back to a more firm, cohesive state when deposited in the paper. The combination of broken-down rubber and rosin or the like would otherwise be too soft and make unified paper too "punky." The zinc oxide also assists mechanically in the breaking down of the rubber during preparation of the impregnant. Other reinforcing pigments may be used. Where the zinc oxide is used as a hardening agent, the amount not used for hardening may be substituted for in whole or in part, as by carbon black. The latter will impart a black color, which may be desired in making unified paper for certain purposes. Inert fillers may be added, or substituted for part of the zinc oxide, to a limited degree. Thus clay and whiting may be used for this purpose. The pigment, and filler if used, should not be of kinds which will cause rapid aging of the impregnant; and should have a particle size, following mastication of the impregnant, which is fine enough to permit of penetration into the paper along with the other impregnant material.

The beta-naphthol is used as an antioxidant to improve the rubber aging qualities and may be substituted for by any other suitable rubber antioxidant or age-resister, such as: "Flectol B" (a liquid condensation product of acetone and aniline), "Flectol H" (a solid condensation product of acetone and aniline), "Solux" (p-hydroxy-N-phenylmorpholine), "Agerie resin" (aldol-alpha-naphthylamine reaction product), "Antox," "Agerite Alba" and "Agerite White."

The oleum spirits is a petroleum hydrocarbon solvent of medium volatility, and may be substituted for by other volatile hydrocarbon solvents such as benzol, heptane, naphtha and gasoline.

Various modifying agents may of course be incorporated to further control the properties, as for example, softening and plasticizing agents may be added.

In order to assist in breaking down the rubber with the least effort, peptizing agents may be employed, as for example benzoyl peroxide or naphthyl-beta-mercaptan, which apparently function as oxidation catalysts and aids to depolymerization. Only a small amount, as less than 1% of the rubber, is needed to produce marked results.

*Example 2*

This example illustrates the use of reclaimed rubber and the use of churn mixing in place of the dry mixing of the previous example.

|  | Parts |
|---|---|
| Reclaimed rubber | 202 |
| Latex crepe | 23 |
| Whiting | 90 |
| Rosin | 315 |
| Beta-naphthol | 2 |
| Oleum spirits | 849 |

The rubber and whiting are milled for about 25 minutes and then placed in a churn with the other ingredients and mixed for about 60 hours at room temperature. The reclaimed rubber contains zinc oxide and hence will cause the rosin to become hardened during the mixing.

Alternatively, and preferably, the above formula may be compounded by using the method described in connection with Example 1, i. e. by dry mixing the rubber to highly masticate before adding in the solvent, so as to place the rubber in a more drastically broken-down form that permits of more thorough impregnation of paper when the latter is not a highly porous type of very open texture.

The paper sheet material may be impregnated with the impregnating solution in any suitable manner that will cause thorough impregnation so as to deposit a sufficient amount of solids within the fibre structure to produce adequate unification. The final impregnant which results upon evaporation, when solutions according to the foregoing formulae or the like are used, is relatively non-tacky owing to the high resin proportion.

A direct saturation method may be used on ordinary sheets of low density (high porosity). The sheet is passed through the impregnating solution until thoroughly permeated, then between a pair of squeeze rolls to remove undesired excess from the surface, and then is festooned and dried. The drying rate should be slow enough so as not to cause such rapid volatilization of the solvent as will produce blow holes or bubbles. An alternative procedure, where the sheet is denser, is to presaturate with a diluted solution (obtained by diluting the stock impregnating solution, given in the above examples, some 20-30% by adding additional solvent), so as to obtain thorough penetration, dry, and then proceed with impregnation with the regular impregnating solution as described above.

When the backing paper is extremely thin and porous, satisfactory results will be obtained by passing between two horizontal rollers, the lower of which dips into the impregnating solution, so as to apply the solution directly to one side only. The solution will be carried through the paper by capillarity. The rollers are set so as to remove excess from the upper side of the sheet, but the lower side which directly receives the solution will be somewhat denser than the other and will bear a slight excess, and will preferably constitute the back side in the completed adhesive tape.

When using relatively heavy paper, a convenient procedure is to apply a diluted solution to the face side (the side which will receive the adhesive coating), and thereafter apply the standard solution to the back side. This order of treatment drives out the air before the more concentrated solution is used. A somewhat similar expedient is to float the paper on the surface of the impregnating solution and then submerge it before it leaves the impregnating bath.

When using relatively thick but open paper a convenient procedure is to first saturate the paper by submergence, then partially dry (for example 20 minutes at 125° F. when using oleum spirits as the solvent), and then apply a back sizing of the same solution.

When using especially dense paper, a preferred procedure is to saturate by submergence in the standard solution, pass between squeeze rolls spaced to leave a substantial excess on the surfaces of the paper, wind in a wet undried condition, allow the roll to stand for about 24 hours to permit completion of absorption, unwind and apply a thin back size of the same solution, and then dry.

The minimum amount of solids (i. e., ingredients of the foregoing formulae exclusive of the solvent) which should be introduced into the backing depends upon the porosity of the latter and upon the aggressiveness of the adhesive coating which is employed. Thus in regard to the latter factor it will be evident that the more aggressive the adhesive the greater the force tending the split the backing or remove fibres when the adhesive tape is unwound from rolls or removed from stacks or from surfaces to which temporarily applied. In the case of adhesive tapes for masking and other purposes requiring an aggressive adhesive, a paper backing should ordinarily contain more than 1 part by weight of impregnant solids per part by weight of paper, and in the case of very porous paper the desired ratio may be as much as 2 to 1. This refers to the amount in the sheet. Generally this is close to the total amount of impregnant solids, as ordinarily there will not be over 10% of the total on the outside (this being mainly on the back side), although for special purposes a greater outside coverage on one or both sides may be employed.

In preparing an adhesive sheet the impregnated backing is coated with a pressure-sensitive adhesive coating. Coatings of the rubber or resin-containing type may be applied directly without the use of an interposed primer and will be firmly anchored owing to the rubber and resin content of the impregnant. The pressure-sensitive adhesive may of course be applied to both sides of the backing when it is desired to make a double-coated adhesive sheet, and in such case the sheet or tape product will be rolled or stacked with use of a liner to prevent sticking together.

In making ordinary single coated adhesive sheets or tapes, the back side is preferably provided with a back sizing coating of a nature which will insure ease of unwinding, without adhesive offsetting or splitting, from rolls which are not provided with liners, preventing the adhesive coating from becoming too firmly united to the back side of adjacent contacting backing. The back sizing is ordinarily applied to the back side of the impregnated backing following drying. A preferred size is shellac, which may be conveniently applied as a 30% solution in denatured ethyl alcohol. A slight excess of impregnant is preferably provided on the back side, so as to provide a smoother base for the shellac and to prevent the shellac solution from striking through, as previously indicated. The shellac coating will also prevent lacquer sagging or running when the adhesive tape is used as a masking tape. In place of shellac, use may be made of cellulose-derivatives, such as cellulose acetate, cellulose nitrate, and ethyl cellulose, applied as a solution in a volatile solvent. Glue in a water vehicle may be applied, provided there is insufficient impregnant on the backside to prevent mechanical anchorage. A wide variety of other back sizings or coatings may be used if desired, owing to general ability of the impregnant to bond, as for example coatings containing rubber (including synthetic rubbers and rubber derivatives) and/or resins.

There should preferably be no excess of impregnant on the face side of the backing when the adhesive is to be applied in a solvent vehicle, as otherwise the adhesive solvent will render the impregnant layer or film slimy and this will interfere with a proper application of the adhesive coating by means of a knife coater or the like.

The pressure-sensitive adhesive may be of the rubber-resin type, as illustrated by the following examples:

Adhesive Example A

| | Parts |
|---|---|
| Latex crepe | 100 |
| Zinc oxide | 100 |
| Wood rosin | 45 |
| Beta - naphthol | 1 |
| Heptane | 450 |

The latex crepe and zinc oxide are milled together on a rubber mill until the latter is thoroughly incorporated in the rubber. The mixture is then placed in a churn with the other ingredients and mixed for about 24 or more hours, producing a homogeneous adhesive solution ready for application. In this case also the zinc oxide hardens the rosin as well as acting as a reinforcing pigment. The beta-naphthol serves as an antioxidant and may be supplemented or replaced by others (Cf. the antioxidants mentioned in connection with the unifying compositions).

The proportions of the ingredients may of course be varied somewhat. However, the ratio of rosin to rubber should preferably be kept within the range of 25 to 100 parts rosin per 100 parts rubber, by weight. The proportion of zinc oxide may be considerably reduced, but for making masking tapes and the like I prefer that the proportion be kept within approximately the range of 25 to 125 parts per 100 parts rubber.

Adhesive Example B

| | Parts |
|---|---|
| Latex crepe | 100 |
| Zinc oxide | 50 |
| Rosin (wood and/or gum) | 60 |
| Lanolin | 18 |
| Pine tar | 6 |
| Beta-naphthol | 1 |
| "Agerite resin" | 1 |
| Heptane | 400 |

The latex crepe, zinc oxide, pine tar, and the antioxidants, are milled together on a rubber mill for about one-half hour to form a base and this is then placed in a churn with the other ingredients and churned for 24–40 hours, or until homogeneous.

The pine tar serves as a softening agent and makes for a longer aging life.

The lanolin also serves as a softening agent and overcomes the tendency of the adhesive coating to become too aggressively adhesive at low temperatures. If it is omitted it is found that when a roll of tape has become chilled, the force required for unwinding is so much greater than at normal room temperatures that breakage of the tape may occur unless great care is taken, and in general the unwinding is more troublesome. The lanolin is completely compatible with the adhesive mixture and will not bleed out at normal temperatures, which are above its solidification point, nor will it prevent the adhesive from having an adequate degree of tack at normal temperatures. At low temperatures it is solidified and reduces the tack so as to offset, or more than offset, the increase in adhesive strength which would otherwise occur. Thus it is possible to make an adhesive tape which will require an unwinding force at 20° F. substantially no greater, or even less, than the unwinding force at 70° F. It will be understood that equivalent materials may be used in place of lanolin to produce this result. Obviously no material should be used which will have a marked deteriorating effect upon the adhesive or which will bleed out.

The adhesive coating may be applied in any suitable way, as by passing the unified sheet through an orifice behind which the adhesive solution is located and which is adjusted to produce the desired coating thickness, followed by drying to evaporate the volatile solvent.

These rubber-resin adhesive coatings are normally tacky and pressure-sensitive, are non-offsetting, and are water-insoluble, non-hygroscopic and moistureproof.

It will be understood that the invention is not limited to the use of rubber-resin adhesives, as any adhesive containing rubber or resin will anchor itself to the unified backing, and if an adhesive is used which will not bond itself sufficiently to the backing, an interposed primer coating may be employed to secure proper anchorage.

An example of another type of adhesive which is normally tacky and pressure-sensitive is one compounded of isobutylene polymer resin of medium degree of polymerization (a transparent rubbery mass) and a tack-producing resin such as rosin or cumarone.

It will be understood that the foregoing examples have been given for purposes of illustration and not limitation.

In the claims it will be understood that where proportions are given of substances which react together, that the proportions are given on an unreacted basis for purposes of convenience, as these represent the formula weights used in compounding.

Having described various embodiments of my invention, but without intent to be limited thereto, what I claim is as follows:

1. A flexible adhesive sheet comprising a flexible porous paper backing impregnated and unified by a composition deposited from solution in a volatile organic solvent and comprised of about 100 parts of thoroughly broken-down rubber, 75 to 125 parts of zinc oxide and 140 to 180 parts of rosin; and a normally tacky and pressure-sensitive non-offsetting adhesive coating directly united thereto and anchored by said composition.

2. A flexible adhesive tape comprising a porous creped paper sheet impregnated and unified by a greater weight of a composition deposited from solution in a volatile organic solvent and essentially comprised of about 100 parts of throughly broken-down rubber, 75 to 125 parts of zinc oxide and 140 to 180 parts of rosin; a normally tacky and pressure-sensitive adhesive coating firmly united to the impregnated paper sheet and comprised of about 100 parts of rubber, 25 to 125 parts of zinc oxide and 25 to 100 parts of rosin; and a back sizing coating firmly united to the back side of the impregnated paper and inactive to said adhesive coating, so as to permit of unwinding the adhesive sheet from rolls without delamination, splitting, or offsetting of adhesive, said adhesive tape having a dead-stretch characteristic and being readily conformed to irregular or curved outlines and surfaces.

3. A flexible adhesive tape comprising a porous paper backing impregnated and unified by a relatively non-tacky non-hygroscopic composition having a fluxed base of broken-down rubber and compatible resin, the proportions of rubber and resin being of the same order of magnitude, and an adhesive coating united to one face thereof and comprised of rubber, a compatible tack-producing resin and lanolin in proportions such that the adhesive is normally non-offsetting tacky and pressure-sensitive, the lanolin being present in amount such that the adhesive tape may be unwound from rolls thereof with substantially no greater unwinding force at 20° F. than at 70° F., and a back-sizing coating on the side opposite the adhesive which is inactive to the adhesive to facilitate unwinding of the adhesive tape from rolls thereof.

4. The method of making an adhesive sheet which comprises unifying a porous paper sheet by impregnating with a solution prepared by dry-mixing rubber until the nerve is largely destroyed and combining approximately 100 parts of said rubber, 75 to 125 parts of zinc oxide and 140 to 180 parts of rosin, and dissolving in an amount of a volatile hydrocarbon solvent which will permit of saturating the paper so as to result in unification; drying the resultant saturated paper; applying a coating of a normally tacky and pressure-sensitive adhesive which has a strong affinity for the unified paper and is dispersed in a volatile liquid vehicle; and drying the coated paper.

5. A flexible adhesive sheet or tape having a porous paper backing impregnated and unified by a substantially non-tacky highly cohesive fluxed blend largely composed of broken-down rubber, admixed compatible water-insoluble solid resin adapted to impart firmness and increase the cementing action upon the fibres of the paper, and reinforcing pigment, said impregnating components being present in proportions such that the blend is flexible and stretchable but inelastic, and a normally tacky and pressure-sensitive adhesive coating firmly united to the backing.

6. A flexible adhesive sheet or tape having a porous paper backing impregnated and unified by a substantially non-tacky highly cohesive fluxed blend largely composed of raw rubber broken-down until the nerve is largely destroyed, admixed compatible water-insoluble solid resin adapted to impart firmness and increase the cementing action upon the fibres of the paper, and reinforcing pigment, said impregnating components being present in proportions such that the blend is flexible and stretchable but inelastic, and a normally tacky and pressure-sensitive adhesive coating firmly united to the backing.

7. A flexible adhesive sheet or tape having a porous paper backing impregnated and unified by a substantially non-tacky highly cohesive fluxed blend largely composed of broken-down rubber, hardened rosin, and reinforcing pigment, said impregnating components being present in proportions such that the blend is flexible and stretchable but inelastic and having a total weight at least about equal to the paper weight, and a normally tacky and pressure-sensitive adhesive coating firmly united to said backing.

8. A flexible adhesive sheet or tape having a porous paper backing impregnated and unified by a fluxed blend of about 100 parts of broken-down rubber, 140 to 180 parts of compatible water-insoluble resin adapted to impart firmness and increase the cementing action upon the fibres of the paper, and reinforcing pigment, the total weight of said impregnating components being at least about equal to the paper weight, and a normally tacky and pressure-sensitive adhesive coating firmly united to said backing.

9. A flexible adhesive sheet having a porous paper backing impregnated and unified by a fluxed blend of about 100 parts of broken-down rubber, 75 to 125 parts of zinc oxide and 140 to 180 parts of rosin, and a normally tacky and pressure-sensitive adhesive coating firmly united to the backing.

10. A flexible adhesive tape having a porous paper backing impregnated and unified by a substantially non-tacky highly cohesive fluxed blend largely composed of broken-down rubber, admixed compatible water-insoluble solid resin adapted to impart firmness and increase the cementing action upon the fibres of the paper, and reinforcing pigment, said impregnating components being present in proportions such that the blend is flexible and stretchable but inelastic, a normally tacky and pressure-sensitive non-offsetting adhesive coating compatible with the impregnating blend and anchored thereby to one side of the backing, and a back sizing coating firmly united to the other side of the backing and inactive to said adhesive coating, so as to permit of unwinding the adhesive tape from rolls without delamination, splitting, or offsetting of adhesive.

11. A flexible adhesive tape comprising a stretchable creped porous paper backing impregnated and unified by a substantially non-tacky highly cohesive fluxed blend largely composed of broken-down rubber, admixed compatible water-insoluble solid resin adapted to impart firmness and increase the cementing action upon the fibres of the paper, and reinforcing pigment, said impregnating components being present in proportions such that the blend is flexible and stretchable but inelastic, a normally tacky and pressure-sensitive non-offsetting adhesive coating firmly united to one side of the backing and a back sizing coating firmly united to the other side of the backing and inactive to said adhesive coating, so as to permit of unwinding the adhesive tape from rolls without delamination, splitting, or offsetting of adhesive, said adhesive tape having a dead-stretch characteristic and being readily conformed to irregular or curved outlines and surfaces.

12. A flexible adhesive tape having a porous paper backing impregnated and unified by a substantially non-tacky non-hygroscopic composition deposited from solution in a volatile organic vehicle within the body of preformed paper so as to bind together the fibres of the paper and largely composed of a fluxed blend of broken-down rubber, admixed compatible water-insoluble solid resin adapted to impart firmness and increase the cementing action upon the fibres of the paper and present in amount exceeding the rubber, and a reinforcing pigment, said impregnating components having a total weight at least about equal to the paper weight and present in proportions such that the blend has a high degree of flexibility, is yieldable and stretchable, firm and cohesive, and firmly unifies the fibres of the paper; a normally tacky and pressure-sensitive adhesive coating firmly united to one side of the backing and a back sizing coating anchored to the other side of the backing and inactive to said adhesive coating; said construction permitting of unwinding the adhesive tape from rolls without delamination, splitting, or offsetting of adhesive.

13. A flexible adhesive tape having a porous paper backing impregnated and unified by a substantially non-tacky non-hygroscopic fluxed blend largely composed of plasticized rubber, admixed compatible water-insoluble solid resin adapted to impart firmness and increase the cementing action upon the fibres of the paper and present in amount exceeding the rubber, and reinforcing pigment, said impregnating components being present in proportions such that the blend has a high degree of flexibility, is yieldable and stretchable, firm and cohesive, and firmly unifies the fibres of the paper; a normally tacky and pressure-sensitive adhesive coating firmly united to one side of the backing; the reverse side of the backing being without excess of said impregnating blend and a dried glue sizing anchored thereto; said construction permitting of unwinding the adhesive tape from rolls without delamination, splitting, or offsetting of adhesive.

14. The method of making an adhesive sheet which comprises unifying a porous paper sheet by impregnating with a solution prepared by breaking down rubber in admixture with a reinforcing pigment and fluxing with an admixed compatible water-insoluble solid resin adapted to impart firmness and increase the cementing action upon the paper fibres, the degree of rubber break-down being sufficient to insure thorough penetration of the paper, and dissolving in a proportion of volatile organic solvent which will permit of saturating the paper so as to result in unification and the deposit of impregnant solids having a weight at least about equal to the paper weight, the proportions of said impregnant solids being such that the impregnant blend is yieldable and stretchable, firm and cohesive, and substantially non-tacky; drying the impregnated paper; and uniting a normally tacky and pressure-sensitive adhesive coating thereto.

RICHARD GURLEY DREW.